Figure 1:
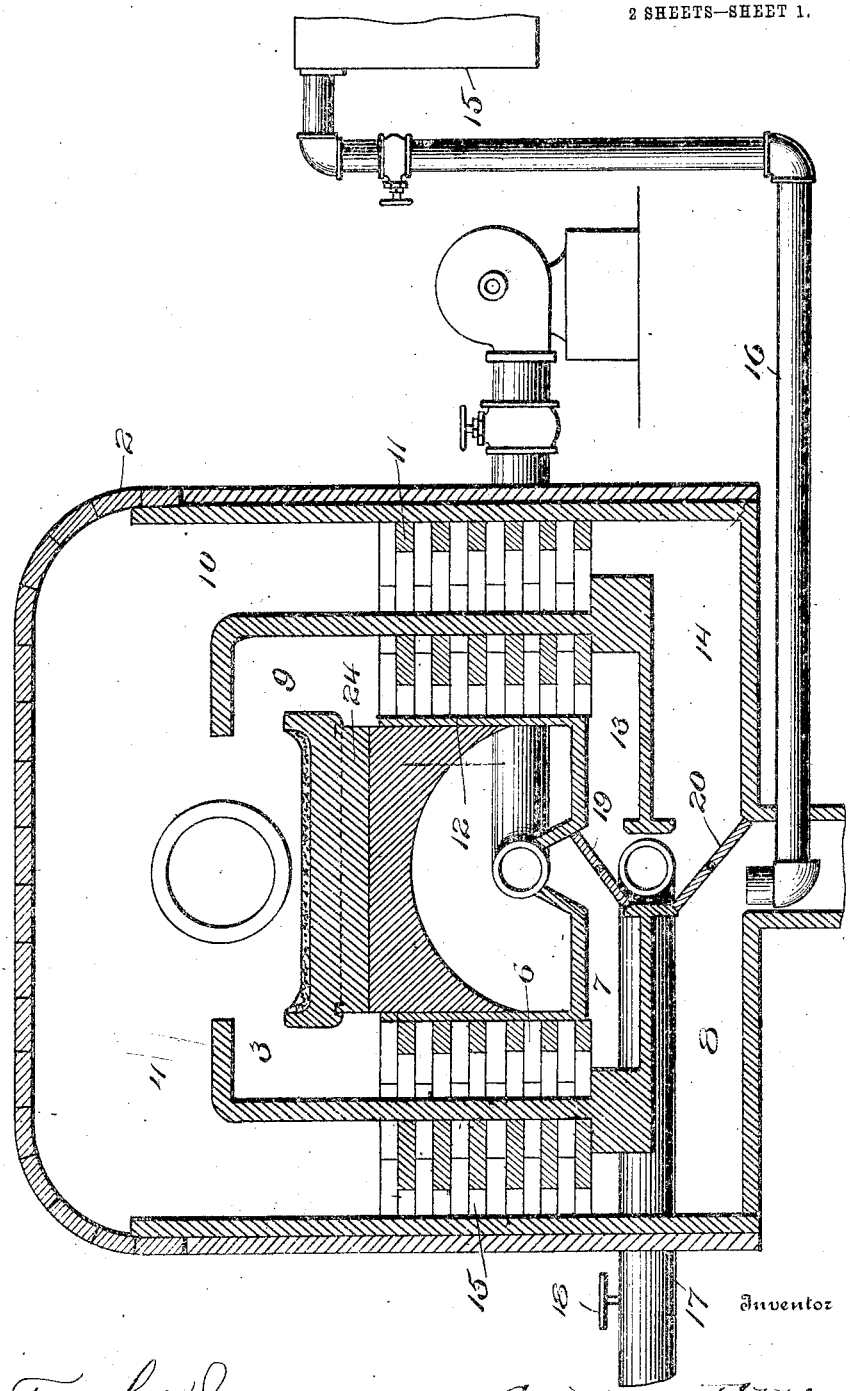

C. ELLIS.
PROCESS OF AND APPARATUS FOR MAKING CEMENT CLINKER.
APPLICATION FILED MAY 23, 1908.

910,121.

Patented Jan. 19, 1909.

2 SHEETS—SHEET 1.

Witnesses
J. M. Fowler Jr.
A. M. Houghton

Inventor
Carleton Ellis
By K. P. McElroy
Attorney

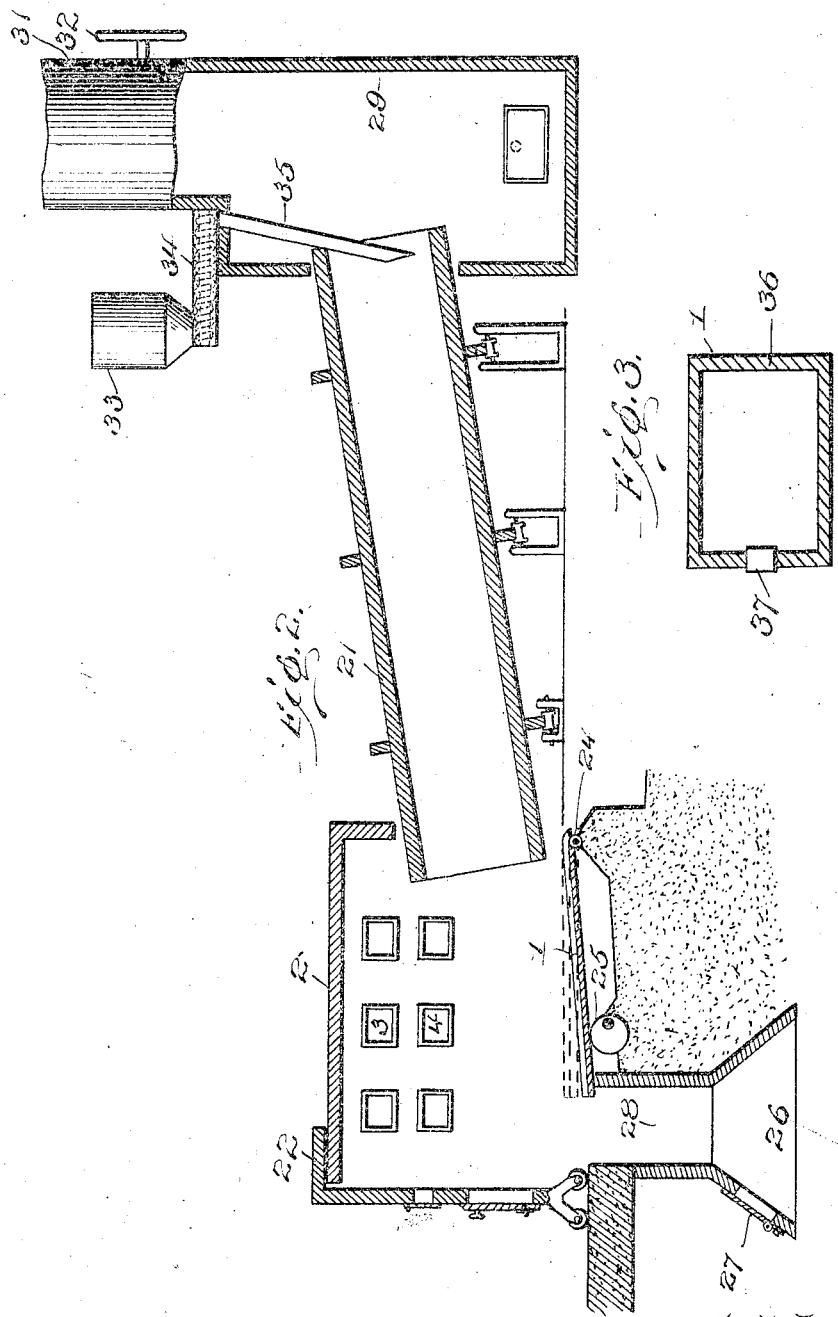

UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

PROCESS OF AND APPARATUS FOR MAKING CEMENT CLINKER.

No. 910,121.   Specification of Letters Patent.   Patented Jan. 19, 1909.

Application filed May 23, 1908. Serial No. 434,554.

*To all whom it may concern:*

Be it known that I, CARLETON ELLIS, a citizen of the United States, residing at Larchmont, in the county of Westchester and State of New York, have invented certain new and useful Improvements in Processes of and Apparatus for Making Cement Clinker, of which the following is a specification.

This invention relates to processes of and apparatus for making cement clinker; and comprises a method in which cement material is first calcined by a portion of the waste gases from a clinkering hearth and is then clinkered on such hearth, the residue of the gases from such hearth being regeneratively employed to maintain the temperature of such hearth; and it also comprises certain organizations of apparatus useful in the described method; all as more fully hereinafter set forth and as claimed.

In the customary methods of making cement clinker in this country, the powdered cement material is fed forward through a rotary inclined cylinder against a current of flame and flame gases going upward through the kiln-cylinder and derived from a flame plume of powdered coal burning in aerial suspension in the mouth of said cylinder. This flame has a double function: in its immediate vicinity it affords a sufficient degree of temperature to cause the calcined cement material to frit and sinter to form clinker while the hot flame gases going beyond calcined such material; that is, deprive its limestone component of carbon dioxid and convert it into lime which, in the clinkering zone, combines with the clay component to form clinker. The requirements of the calcining and clinkering operations are quite different, the first requiring a large volume of hot gases but no great temperature, while the conditions in the second are the reverse.

While the described ordinary simple rotary kiln is labor-saving it is not economical of fuel and there are sundry other disadvantages. For one thing, the high temperature in the clinkering zone is difficult to attain with other fuels than powdered coal in aerial suspension; and fine-grinding coal is somewhat expensive. And in producing such a coal flame, it is necessary to provide for a copious influx of air, quick and intense combustion only taking place in the presence of an excess of air, and, since all the draft is through the kiln itself, there is a violent rush of flame gases and air through the kiln which tends to pick up much dust. The finely powdered cement mixture in normal calcining evolves carbon dioxid throughout its mass, and this gas evolution combined with the great draft of the kiln causes the stated dusting. For another thing, the intensely hot gases coming from the clinkering flame tend to hug the roof of the kiln, spaced away from the stream of cement material flowing down its base by a layer of cooler air and of carbon dioxid evolved by such material. It is for this reason that the ordinary rotary kiln of 6 or 7 feet internal diameter is usually made about 60 feet long for beyond 60 feet in kilns of the usual type the superimposed hot gas stratum no longer communicates a useful amount of heat through the underlying cooler currents to the cement material. But the most serious disadvantage is that with the single kiln the two operations are made interdependent since the rate of flow of material through the calcining zone must be the same as the rate of flow through the clinkering zone; the material must travel in a continuous stream through both. The requirements of the two operations are so diverse that they should not as a matter of good practice be so linked together.

In the present invention, I have devised means for and a method of performing the two operations independently and each under the conditions best adapted thereto while at the same time retaining the advantage of the present practice of using a single source of heat. This source of heat is preferably gas, such as producer gas. Producer gas, while it has frequently been suggested for firing cement kilns is little used in practice since it does not give the necessary amount of heat for clinkering unless its flame temperature be "stepped up" in some manner; as by the use of regenerators or recuperators—neither of which however is practicable for use with the ordinary single rotary kiln because of the inordinate dusting which takes place in a kiln and which causes the issuing gases to be heavily laden with dust. An ordinary regenerator or recuperator used with an ordinary rotary cement kiln would quickly become stopped up with dust.

Producer gas, generator gas, water gas and other cheap gases are however perfectly capable of producing the very high flame temperatures needed in clinkering when used in connection with regenerators or recuperators, and they are so used in the present invention. While powdered coal, oil or rich gas may also be employed, and with advantage in some cases, I regard my invention as particularly adapted for use with the cheap forms of producer gas and such gas will be more specifically recited hereinafter.

In the present invention, the two operations of calcining and clinkering are more or less segregated, each being performed in apparatus particularly adapted thereto. The calcining I perform in a rotary kiln with the aid of a stream of hot waste gases substantially filling the whole cylinder and therefore contacting with the stream of cement material instead of being spaced away therefrom as in the ordinary kiln, developing the flame yielding the waste gases elsewhere than in this kiln so that there will be no necessity for instituting draft conditions and consequent stratification of gases therein. Under these conditions a maximum economy of heat in the calciner may be obtained and an efficient calcination as well. In some measure, the sheer temperature required for calcination is reciprocally related to the percentage of carbon dioxid in the gas mass bathing the material being calcined so that in the ordinary operation where the evolved carbon dioxid tends to flow forward over the cement material as a discrete stream underlying the hot flame gas stratum, as in the stratified gas currents going through the ordinary kiln, calcination conditions are not as favorable as in the present method where evolved dioxid is at once diluted in the hot gas mass filling the kiln and bathing the solid cement material.

The hot calcines, free or substantially free, of carbon dioxid, I deliver upon a hearth where such calcines are raised to a clinkering heat, the hearth chamber being heated by any suitable fuel. Waste gases from the hearth chamber though preferably but a portion of such gases, are passed upward through the rotary kiln to effect calcination in the manner described. It will be noted that in the described operation, I make calcination and clinkering wholly independent operations though retaining the advantage of the ordinary practice of using but a single source of heat. There is, of course, no necessary relation between the speed of feed of materials through the rotary kiln and the length of time that materials remain on the hearth, and each operation can be independently regulated. Preferably, I heat the hearth chamber with gas, such as producer gas, blast furnace gas, etc., and use regenerative or recuperative means for stepping up flame temperatures. Substantially all the dusting occurring in the calcining kiln, regenerators or recuperators can be used in connection with the clinkering chamber.

In using producer gas, for chemical reasons, the volume of air necessary for burning the gas will be but half the volume of the resultant products of combustion. Therefore but half of such products of combustion will be needed to heat regenerators serving the clinkering chamber while the remaining half may be sent up the calcining kiln. In practice, a still greater proportion may be used in the calcining kiln.

A hearth chamber of the type of the reversing furnaces where production of flame and withdrawal of waste gases alternate on the two sides of the hearth, may be very conveniently employed in the present invention, the hearth chamber and calcining kiln being so connected that the calcines are delivered directly upon the hearth, while such portion of the products of combustion as is not needed in the regenerators passes directly up the calciner. By suitable regulation of dampers in the stacks respectively connected with the regenerators and with the calcining kiln the fractions of waste gases passing either way can be regulated and controlled. No flame being produced in the calcining kiln, there is no stratification of gases therein nor is there a violent rush of gases therethrough so that dusting losses are minimized.

The hearth itself may be of any convenient type. If it be desired to push the clinkering heat up to the point of fusing the clinkered material, such fused material may be tapped off the hearth into a suitable conduit and there cooled or quenched. Or, if the material be merely sintered or fritted, as in the ordinary practice, it may be withdrawn from time to time by suitable tools or it may be discharged by rocking or otherwise manipulating the hearth in well understood ways.

In the accompanying illustration I have shown, more or less diagrammatically, certain types of apparatus of the many adapted to be employed in the described process.

In this showing: Figure 1 is a vertical transverse section on line $y$—$y$ of Fig. 2, showing hearth and gas and air ports; Fig. 2 is a vertical longitudinal section of Fig. 1; and Fig. 3 is a plan view of an alternative form of hearth.

In Fig. 1, the hearth is denoted by 1 and the inclosing hearth chamber wall by 2. Entering the chamber at either side are ports for air and gas. The ports at the left of the hearth are respectively marked 3 and 4, and each communicates with a regenerator checkerwork, that for the air being marked 5 and that for the gas 6. Duct 7 serves alternately for introduction of air and removal of waste gases; duct 8 alternately for introduction of gas and removal of waste gases. The arrangement at the right of the hearth is exactly the same, ports 9 and 10 being for air and gas from checkers 11 and 12 while ducts 13 and 14 serve alternately for air and gas and for removal of waste products of combustion. Producer 15 serves the furnace with gas through pipe 16 while flue 17, valved at 18, leads products of combustion away to a stack (not shown). A pair of valves 19 and 20, of familiar type, serve to control the circulation to, through and from the hearth chamber. Element 21 is the end of the calcining kiln.

Referring now to Fig. 2 which shows a view at right angles to that of Fig. 1, 22 is a movable hood closing the end of the hearth chamber and provided with door 23. The hearth, which is, as here shown, of a rocking type, is mounted on roller 24 at the rear end and cam 25 at the front, whereby it may be given a rocking motion or may be adjusted at different angles of inclination. Clinker is discharged from the front end into closed clinker pit 26 having an adjustable door 27 and a pipe connection 28 for introducing quenching water or steam. The door serves to control the ingress of air into the clinker-pit. The calcining kiln, which is of the familiar open-ended cylindrical inclined rotary type at its upper end enters the stationary housing 29 provided with dust door 30 and stack 31, dampered at 32. Cement material is fed from hopper 33 by means of conveyer 34 to chute 35 which discharges it within the calcining kiln.

In Fig. 3 is shown a plan view of a hearth suitable for use when it is desired to fuse the clinkered material. As shown, this hearth has an inclosing dam 36 which at 37 is provided with an orifice closed by a plug of readily removable material so that by removing this plug the fused material may be tapped off at intervals.

The operation of the heating means shown in Fig. 1 is obvious. As shown, valve 19 is set so that air may pass through 7, 6 and 4 into the hearth chamber, burning gas from 3, while products of combustion may go to exit through 9, 10, 12, 11, 13 14 and 17. Valve 20 is shown so set that gas may pass from 16 through 8, 5 and 3 to be burned as just described while products of combustion may pass away from the furnace chamber just as described. With this setting, the flame burns at the left of the hearth chamber while when the valves are reversed the flame will burn at the right. An adjustable amount of intensely heated auxiliary air ascends from the clinker pit.

With this apparatus, the temperature of the flame sweeping across the hearth may be raised to almost any temperature desired and clinkering easily and quickly effected. If desired, the clinker may be fused and tapped off the hearth as liquid, or it may be produced in the ordinary sintered masses. In the latter event, the hearth may be rocked to promote the passage of the clinker forward to the clinker pit, or the clinker may be raked forward by suitable tools. Whatever the rate of feed and of treatment of material in the rotary calciners the calcines may obviously be allowed to remain on the hearth for as long or short a time as may be desirable. With a regenerated gas flame produced as described, however, the time required for clinkering is relatively very short, the temperature being high so that a hearth of moderate size may deal with the calcines from several rotary calcining kilns.

Clinkering being an operation consuming but little heat though requiring an intense temperature, while it may even develop some heat, and the heat units developed in the clinkering chamber being largely intercepted from the gases going to waste through the regenerators and returned to such chamber, a large part of the total heat units developed in the hearth chamber therefore in practice are delivered to the fraction of the waste gases which go through the calciner. In the calciner the consumption of heat is large but by presenting the gases as hot as are the waste gases from the regenerated flame of the clinkering hearth calcination is quickly effected. The gases entering the calciner at so high a temperature, the curve of evolution of carbon dioxid is quite sharp so that a relatively short calciner may be employed while at the same time absorption of heat may be quite effective, the gases finally passing away relatively cool. The burning gases being effectively mixed and their combustion being practically completed in the hearth chamber, such portion of waste gases as is drawn off through the calciner is not stratified and hence is all effective for calcination. With proper regulation of dampers in the waste gas exit of the regenerators and in that of the calcining kiln, a comparatively slow, regular movement of gases may be produced through the calciner, thereby at once preventing dusting and contributing to effective utilization of heat units therein. Since the air drawn from the clinker pit may be as hot as that from the regenerators, an equivalent amount of the products of combustion from the hearth chamber may be diverted through the calciner. Any steam which may be formed in quenching clinker ascends with the hot air and proves useful in the calciner, the presence of water vapor much facilitating calcination.

The raw material employed in the apparatus may be any of the materials customarily employed for making cement clinker such as clay and limestone, naturally or artificially mixed, mixtures of slag and lime, cement rock, etc.

The producer gas may be directly introduced from the producer without going through a generator as such gas is customarily very hot and sufficiently so to be able to afford, with regenerated air, the flame temperatures necessary. In so doing, the regenerator chambers may be somewhat smaller and a further quantity of the flame gases may be diverted up the calcining kiln. In regeneratively heating the gas, recuperators may be employed beyond the regenerator to aid in heating the air.

What I claim is:—

1. The process of producing cement clinker which comprises the clinkering of calcined cement material by a flame burning with regeneratively heated air, diversion of a portion of the flame gases from such flame into regenerative heaters for air for said flame and calcination of cement material by the residue of said flame gases.

2. The process of producing cement clinker which comprises the clinkering of calcined cement material by a flame of hot gas burning with regeneratively heated air, diversion of a portion of the flame gases from such flame into regenerative heaters for said flame, and calcination of cement material by the residue of said flame gases.

3. The process of producing cement clinker which comprises the clinkering of calcined cement material by a flame of hot producer gas burning with regeneratively heated air, diversion of a portion of the flame gases from such flame into regenerative heaters for said flame, and calcination of cement material by the residue of said flame gases.

4. The process of producing cement clinker which comprises producing a traveling stream of cement material, calcination of such stream by an opposed current of intensely heated flame gases from such flame coming from a regeneratively fed clinkering flame drawing heat from another portion of such flame gases, delivering the calcined material on a hearth in proximity to such flame, maintaining the calcined material on such hearth until clinkering is effected and finally withdrawing the clinkered material.

5. The process of producing cement clinker which comprises calcining cement material in a rotary inclined kiln by a body of intensely heated flame gases, delivering the calcines into proximity of a regeneratively supplied flame burning in a stationary hearth chamber and there clinkering the same, diverting a portion of the flame gases from such flame into the calcining kiln and passing the residue of said flame gases into regenerators supplying said flame.

6. In the manufacture of cement clinker, the process which comprises clinkering calcined cement material on a stationary hearth by a regeneratively supplied gas flame, and calcining raw cement materials by a diverted portion of the hot flame gases from the same flame, the calcines so produced being supplied to said hearth.

7. The process of producing cement clinker which comprises clinkering calcines on a hearth by a flame burning thereover, diverting a portion of the hot flame gases to supply recovered heat to said flame, diverting the residue of said gases in a well-mixed state to a separate calcining kiln, and supplying calcines from said kiln to said hearth.

8. A clinker making plant comprising a hearth chamber and a calcining kiln delivering and opening into such hearth chamber, means for producing a regeneratively supplied flame in such hearth chamber, regenerators for feeding such flame and means for dividing the hot flame waste gases between such calcining kiln and such regenerators.

9. A clinker making plant comprising a stationary hearth chamber and a rotary calcining kiln supplying calcines thereto and withdrawing a portion of flame gases therefrom, and means for heating said hearth chamber, said means comprising heat recovering means utilizing the residue of said flame gases and flame producing means utilizing the recovered heat.

10. A clinker making plant comprising a hearth chamber, flame producing means for such chamber, heat recovering means in communication with such flame producing means and such chamber, a calcining kiln delivering calcines to said hearth chamber and in open communication therewith, and regulable means for sending adjusted proportions of hot flame waste gases through such calcining kiln and such heat recovering means.

11. A clinker making plant comprising a hearth chamber, flame producing means for such chamber, heat recovering means in communication with such flame producing means and such chamber a rotary inclined calcining kiln delivering calcines to said hearth chamber and in open communication therewith, and regulable means for sending adjusted proportions of hot flame waste gases through such calcining kiln and such heat recovering means.

12. A clinker making plant comprising a hearth chamber, means for producing a gas flame therein, regenerative means abstracting a portion of the hot gases from the flame and returning their heat to the chamber and a calcining kiln delivering calcines to the hearth chamber and abstracting the residue of the hot flame gases therefrom.

13. A clinker making plant comprising a hearth chamber, means for producing a gas flame therein, regenerative means abstracting a portion of the hot gases from the flame and returning their heat to the chamber, and a rotary inclined calcining kiln delivering calcines to the hearth chamber and abstracting the residue of the hot flame gases therefrom.

14. A clinker making plant comprising a reversing hearth-furnace provided with heat-regenerating devices, a rotary inclined kiln set to discharge calcines upon the hearth of said furnace, flame producing means in said furnace and means for causing hot flame gases from said flame producing means to flow through both the heat-regenerating devices and the kiln in controlled proportions.

15. A clinker making plant comprising a gas-fired hearth furnace, regenerating means for producing a high-temperature gas flame over the hearth, a rotary inclined kiln opening into the furnace chamber over said hearth, and means at the upper end of said kiln for permitting the flow of a regulated amount of hot flame gases from said flame up and through the kiln.

16. A clinker making plant comprising a reversing gas-fired furnace provided with a hearth and with regenerators on opposite sides communicating with the hearth chamber adapted to produce a regeneratively heated gas flame over said hearth in alternation, waste-gas removing means for said regenerators, a rotary inclined kiln opening into the hearth chamber and discharging upon the hearth, and waste gas removing means at the upper end of the kiln for removing a portion of the flame gases through the kiln.

In testimony whereof I affix my signature in the presence of two witnesses

CARLETON ELLIS

Witnesses:
BISDELLA M. ELLIS,
NATHANIEL L. FOSTER.